UNITED STATES PATENT OFFICE.

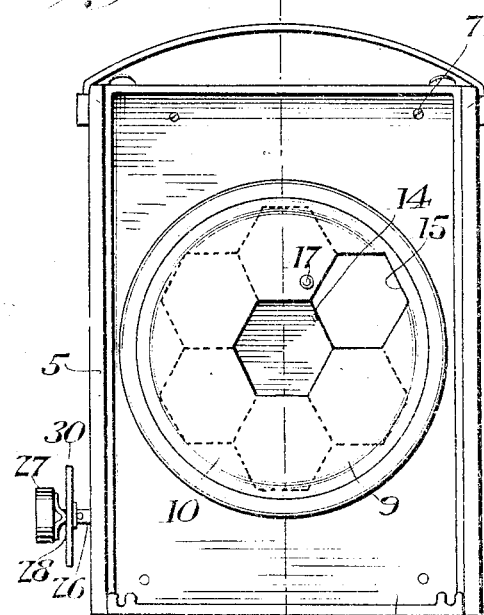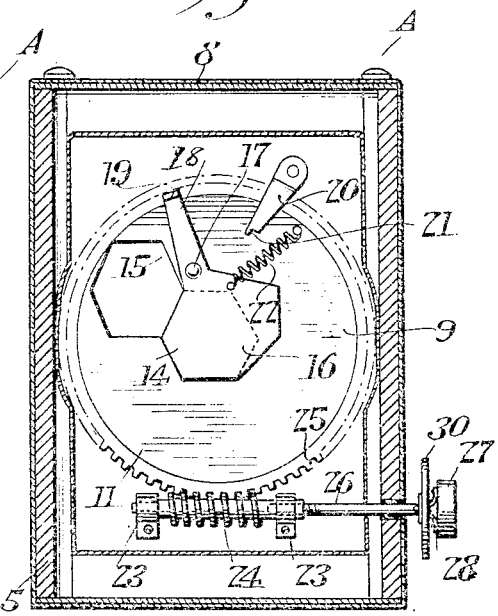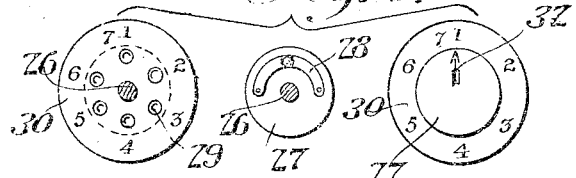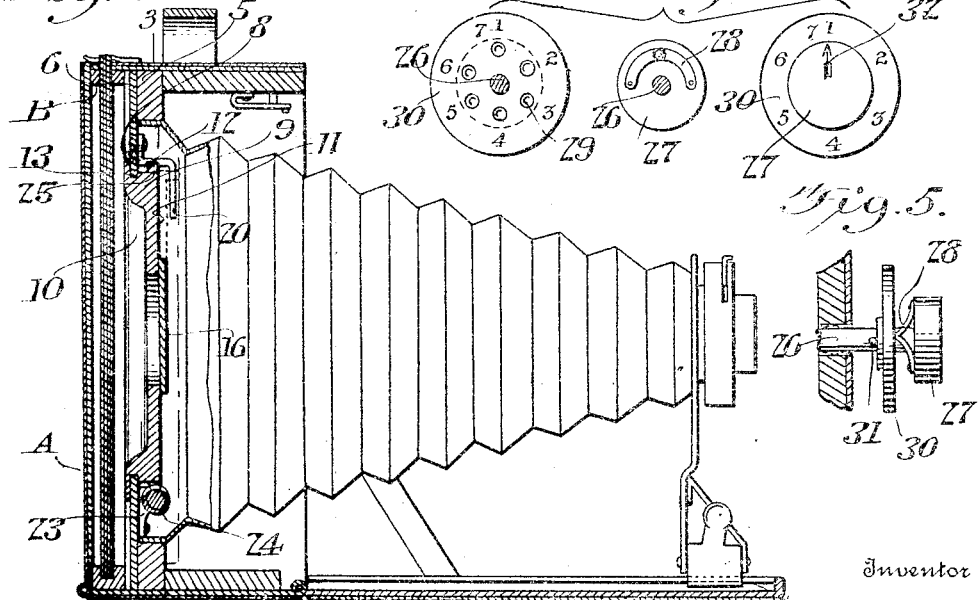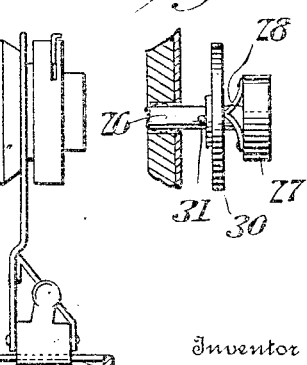

JAMES J. QUINN, OF EDDYSTONE, PENNSYLVANIA.

EXPOSURE-SHUTTER FOR CAMERAS.

1,173,861.   Specification of Letters Patent.   Patented Feb. 29, 1916.

Application filed May 7, 1915. Serial No. 26,554.

*To all whom it may concern:*

Be it known that I, JAMES J. QUINN, a natural-born citizen of the United States, residing at Eddystone, in the county of Delaware and State of Pennsylvania, have invented new and useful Improvements in Exposure-Shutters for Cameras, of which the following is a specification.

The invention relates to a shutter, and more particularly to the class of exposure shutters for cameras.

The primary object of the invention is the provision of a shutter of this character wherein a predetermined number of exposures can be successfully made upon a single film or sensitized plate, thereby enabling a series of negatives to be had thereon, thus permitting the grouping of subjects of different poses on a single negative for the production of pictures therefrom.

Another object of the invention is the provision of a shutter of this character wherein the grouped subjects on the print thereof from the negative will be pleasing and attractive to the eye, and will permit the taking of a number of subjects with a minimum number of films or plates.

A further object of the invention is the provision of a shutter of this character wherein the same is constructed to fit within the body or box of a camera, irrespective of the size thereof, and that will permit a number of exposures to be made on a single film or negative.

A still further object of the invention is the provision of a shutter of this character which is simple in construction, novel in form, readily and easily operated, thoroughly reliable and efficient in its purpose, and inexpensive in manufacture.

With these and other objects in view, the invention consists in the construction, combination and arrangement of parts as will be hereinafter fully described, illustrated in the accompanying drawing, and pointed out in the claims hereunto appended.

In the drawing:—Figure 1 is a rear elevation of a camera with the film or plate holder removed, showing the shutter constructed in accordance with the invention applied. Fig. 2 is a sectional view on the line 2—2 of Fig. 1, looking in the direction of the arrow. Fig. 3 is a sectional view on the line 3—3 of Fig. 2, looking in the direction of the arrow. Figs. 4 and 5 are detail views of the indicator parts for use with the shutter.

Similar reference characters indicate corresponding parts throughout the several views in the drawing.

Referring to the drawing in detail, A designates a portion of a camera of the folding type, which is of the ordinary well-known construction having fitted in its body at the rear thereof a film pack or plate holder B which as usual is removable therefrom for unloading purposes.

Within the body A and fixed to its frame 5 is a shutter structure comprising a substantially rectangular shaped plate 6, preferably made from metal, which is secured within the said body in any suitable manner, for example, through the medium of screws 7 which are passed therethrough and engage in the frame 5 to assure against light cracks or joints, and has formed centrally therein an opening 8 in which fits a rotary disk 9 having a concaved face 10 next to the films or plates, while the other face is flat, as at 11, having a circular perimeter 12 provided with a channel or groove 13 forming a rabbet for receiving the edge of the opening 8 for the rotatable mounting of the disk in the said plate for a purpose presently described.

Formed in the disk 9 are a substantially hexagonal shaped central opening 14, and an opening 15 at one side of the center opening 14, providing exposure apertures for the films or sensitized plates, and these apertures communicate with each other and are adapted to be intermittently opened and closed through the medium of a trip slide or shutter 16 swingingly supported upon a pivot 17 mounted in the disk 9, the slide or shutter 16 being formed with a trip arm 18 having an out-turned nib 19 which protrudes into the path of a tripping elbow 20 fixed to the plate 6 and which is notched at its free end to form a tripping finger 21 to engage with the nib 16 for the automatic operation of the slide or shutter 16. This slide or shutter 16 is adapted to normally close the center aperture 14 until the disk 9 has made a complete revolution, whereupon the nib 19 is operated upon by the tripping elbow 20, which throws the slide or shutter 16 into a position for closing the aperture 15 momentarily for the making of a single exposure through the center opening 14, whereupon the arm is again moved to a position after being released from the elbow 20 for closing the center opening 14 so that a number of exposures can be had about the center negative.

Connected to the slide or shutter 16 is one end of a coiled tension spring 22, which has its opposite end connected to the disk 9, and this spring serves to tension the shutter to automatically move the same from its position covering the concentric aperture 15 to a position for closing the center aperture 14, as is clearly shown in Fig. 3 of the drawing, after the arm 19 has been tripped by the elbow 20, the said slide or shutter 16 being momentarily held in position by the elbow 20 to close the concentric opening 15 for uncovering the center aperture 14 so that a single exposure will be made therethrough, while a number of exposures can be made through the concentric aperture 15 on the rotation of the disk 9 in a manner presently described.

Arranged below the disk 9 and fixed to the plate 6 are journal bearings 23 in which are journaled an operating worm screw 24 meshing with worm gear teeth 25 formed at the periphery of the disk 9, and detachably engaged with this screw 24 is an operating shaft 26 which is passed through one side of the body A of the camera and has formed thereon without the same a turning knob 27 which carries at its inner side a resilient latch member 28 which is adapted to engage in any one of a series of depressions 29 formed in the outer face of an indicator disk 30 which is loosely journaled upon the shaft 26 and is held in its co-acting relation with the latch member 28 through the medium of a cross pin 31 mounted transversely in the said shaft 26, the said disk being marked with suitable indicia to indicate the number of exposures, while the hand knob 27 has on its outer face a pointer 32 which coöperates with the markings on the disk 30 so that an accurate adjustment of the disk 9 can be had when operating the knob 27 and the indicator disk 30 which is set independently of the rotation of the shaft to accurately determine the number of exposures, while the knob 27 when operated will adjust the disk for the automatic operation of the shutter.

In operating the slide or shutter and the rotary disk 9 by the shaft 26 it is necessary to determine with accuracy the exact position of the disk 9 and also the extent of adjustment thereof. Therefore, to definitely determine this, the operator of the camera grasps the indicator disk 30 with one hand so as to prevent the same from turning with the shaft 26 and, with the other hand, the knob 27 is gripped so that on the turning of the latter the shaft will be rotated, while the disk 30 will be held stationary. When the knob is turned the latch member 28 will travel from one depression to another and engage therein, while the pointer 32 will coöperate with the scale or indicia on the disk to enable the operator to determine with accuracy the position of the rotary disk and the extent of adjustment thereof.

It will be noted that on the adjustment of the shutter a single exposure can be made centrally of the film or sensitized plate, and also a number of exposures can be made concentrically with respect to the center negative on the single film or plate.

What is claimed is:—

1. A shutter for a camera comprising a plate having an opening, a disk rotatable in said opening and having a center aperture and also a side aperture, a slide pivotally mounted on the disk for closing either of said apertures, means for normally holding the slide in a position to close the center aperture, and means on the plate and projecting into the path of the slide to intermittently move the same for opening the center aperture and closing the side aperture.

2. A shutter for a camera comprising a plate having an opening, a disk rotatable in said opening and having a center aperture and also a side aperture, a slide pivotally mounted on the disk for closing either of said apertures, means for normally holding the slide in a position to close the center aperture, means on the plate and projecting into the path of the slide to intermittently move the same for opening the center aperture and closing the side aperture, and means for locating the disk and adapted to be projected exteriorly of the camera.

In testimony whereof I affix my signature in presence of two witnesses.

JAMES J. QUINN.

Witnesses:
   Jos. T. O'Donnell,
   John E. Pryor.